United States Patent

Gilliam, Jr. et al.

[11] Patent Number: 5,228,467
[45] Date of Patent: Jul. 20, 1993

[54] FILTER MEDIA CLEANING SYSTEM

[76] Inventors: Clyde H. Gilliam, Jr., 258 Shenandoah Dr., Birmingham, Ala. 35226; James A. Smith, 1007 Gerald St., St. Anne, Ill. 60974

[21] Appl. No.: 763,577

[22] Filed: Sep. 23, 1991

[51] Int. Cl.$^5$ .............................................. B08B 3/02
[52] U.S. Cl. .................................. 134/100.1; 134/151; 134/172; 210/225
[58] Field of Search ..................... 134/100, 100.1, 151, 134/153, 172; 210/225

[56] References Cited

U.S. PATENT DOCUMENTS

| | | | |
|---|---|---|---|
| 3,139,890 | 7/1964 | Moran | 134/100 |
| 3,355,324 | 11/1967 | Catzen | 134/100 X |
| 3,563,474 | 2/1971 | Robinson | 134/172 X |
| 4,076,033 | 2/1978 | Busse et al. | 134/172 |
| 4,261,831 | 4/1981 | Linsenmeyer | 134/172 X |
| 4,289,618 | 9/1981 | Schotten et al. | 210/225 X |
| 4,343,710 | 8/1982 | Shackelton et al. | 210/225 X |

FOREIGN PATENT DOCUMENTS 292906  7/1966  Australia ............................ 134/153

*Primary Examiner*—Philip R. Coe
*Attorney, Agent, or Firm*—Veal & Associates

[57] ABSTRACT

A method and apparatus for cleaning filter media in dewatering apparatus in situ includes an applicator which sprays a mixture of water and a cleaning agent onto a filter media as the applicator and media undergo relative movement. The cleaning solution contains selected oxidizers and dispersants to break the polymer bond and remove polymeric residues from the media without the need for removing the media from the apparatus.

9 Claims, 2 Drawing Sheets

FILTER MEDIA CLEANING SYSTEM

FIELD OF THE INVENTION

The present invention relates to the field of industrial dewatering apparatus and processes including those found in wastewater treatment plants. More particularly the present invention relates to a method and apparatus for cleaning residual polymer, oil and grease depositions from filter media used in sludge dewatering. In even more particularity the present invention relates to a method and apparatus for cleaning such filter media automatically and in situ.

BACKGROUND OF THE INVENTION

Polymers are commonly used in water treatment equipment to aid in the removal of solids suspended in water. Ionic polymers, or polyelectrolytes, carry an electrostatic charge which attracts particles suspended in water and build a strong cell-like structure which permits mechanical dewatering of the solids in such a structure using pressure. Such dewatering apparatus includes belt presses and plate presses which carry filter media. Such apparatus is commonly known in the art and specific examples thereof will not be given herein. The filter media is typically a filter cloth of fine mesh material which allows water to pass therethrough and prevents solids from passing therethrough.

A common problem with the use of polymers in dewatering processes is that polymeric residues can contaminate hard surfaces and filter media in and around places where polymers are used. In some applications, the resultant residues can be removed through hard scrubbing and excessive water rinsing, however such removal is difficult and time-consuming in as much as the polymers provide a sticky solution which is difficult to remove from the machinery. Furthermore, the wet residual polymer solutions are extremely slippery and are the cause of injuries to plant personnel due to falls.

As will be appreciated, deposition of the polymeric residue on the filter media results in a clogging or blinding thereof which greatly reduces the effectiveness of the filter material in producing dry solids. Accordingly operating costs of a plant with presses of reduced effectiveness are increased when the insufficiently dried solids must be recycled through the treatment facility. The blinding problem is intensified in applications where oil and/or grease is deposited in solutions with the polymer residue.

High pressure rinses have been installed in the dewatering apparatus to attempt to flush the contaminants from the filter media. However rinsing does not totally remove the polymer/oil and grease problem. Also methods of applying polymer cleaners using brooms and hand-held sprayers have not been known to achieve a clean deposit-free filter and as noted above are unsafe and time-consuming. Using currently known methods, filter media must be replaced after a short period of time at considerable cost in labor and materials as well as down time for the equipment.

SUMMARY OF THE INVENTION

It is the object of the present invention to improve the operating efficiency of sludge dewatering apparatus by providing an easier and more effective way to reduce costs and time expenditures in cleaning the filter media thereof.

It is yet another object of the present invention to reduce the risk of injury to plant personnel occasioned by falls on slippery polymer residue during maintenance operation It is a further object of the invention to provide a method and apparatus for effectively cleaning filter media in situ by breaking the polymeric bonds of the residue.

In the furtherance of these and other objects of the invention we utilize a liquid cleaning solution which is metered into a stream of water at a prescribed dilution rate and sprayed in solution onto the filter media. The chemical reaction of the cleaning solution with the polymeric residue releases the polymeric bonds to enable the residue to be removed by the high pressure rinse system of the dewatering apparatus. The invention may be adapted to all filter presses, screens, gravity belt thickeners regardless of manufacturer.

BRIEF DESCRIPTION OF THE DRAWINGS

Apparatus used in my invention are depicted in the accompanying drawings which form a portion of this disclosure and wherein.

DESCRIPTION OF A PREFERRED EMBODIMENT

Figure 1:
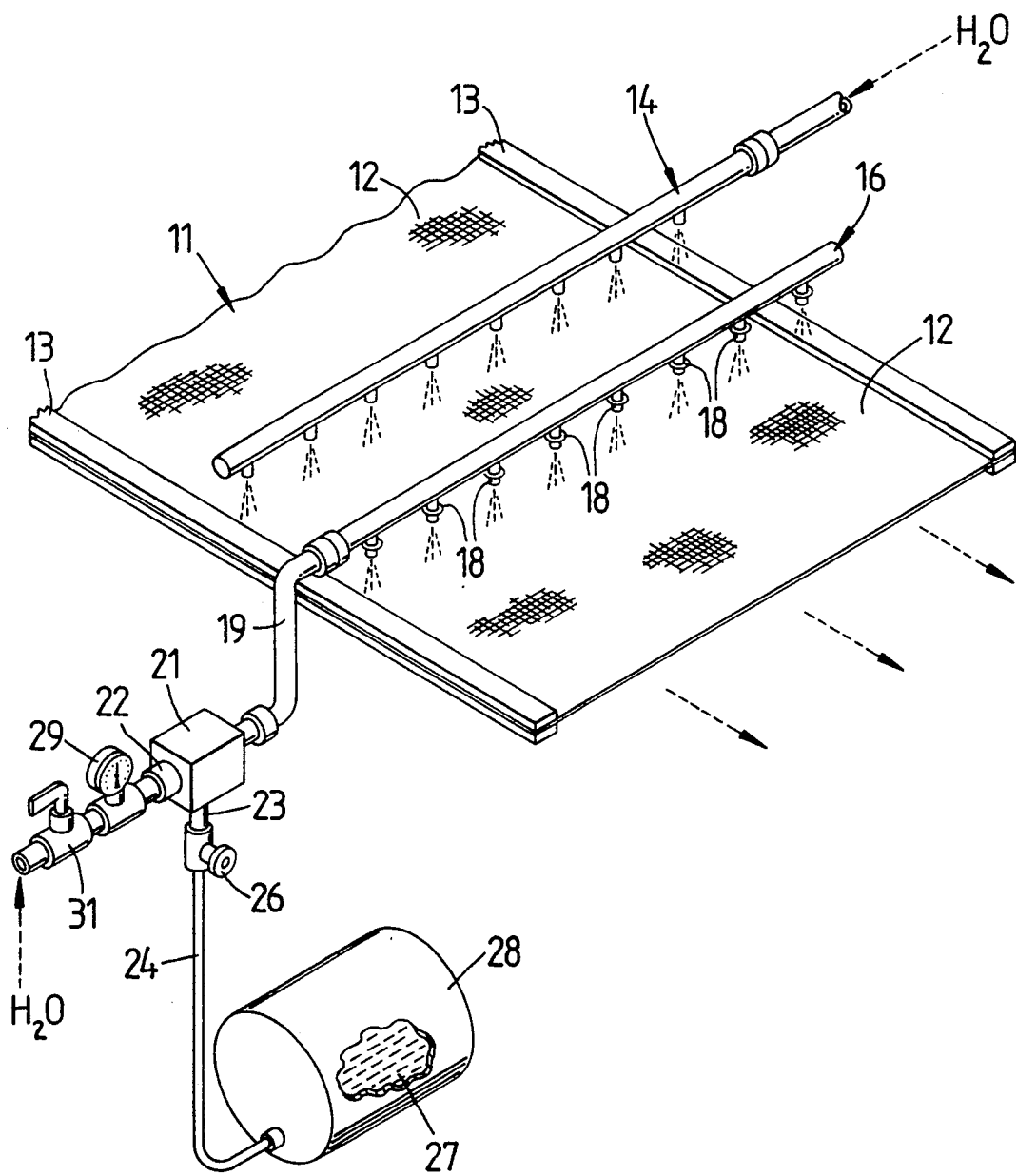
FIG. 1 is a schematic diagram of my invention as applied to a moving filter media.

The present invention utilizes a cleaning solution and a delivery apparatus therefore to accurately and effectively clean the filter media of the dewatering apparatus. In application, such as shown in FIG. 1, the delivery apparatus remains stationary while the filter media moves relative thereto, thus exposing all of the media to the cleaning solution as the media passes the delivery apparatus. In other applications, as in FIG. 2, the delivery apparatus may move relative to the filter media as in cleaning a plate type press.

As may be seen in FIG. 1 the belt 11 of a dewatering apparatus is comprised substantially of a filter media 12 which may include lateral closure members 13. A high pressure rinse sprayer 14 is typically positioned near the belt 11 to direct a spray of water through the media 12 in opposition to the direction of flow of water removed from the solids in the apparatus. In our invention we utilize a spray bar 16 which spans the filter media 12 and in this embodiment is mounted to the frame of the apparatus at a fixed point. The spray bar may be ¾ inch PVC tubing or any other suitable conduit which can support the spray heads 18. The spray heads 18 are spaced along the spray bar 16 to insure application of the cleaning solution over the entire width of the filter media. These heads may be commercially available items such as Delavan Thermo Plastic Nozzles LF-5 having a maximum operating pressure of 120 psi.

The spray bar 16 is in internal communication via appropriate tubing 19 with an injector 21 which includes an inlet 22 for receiving water from a remote source and a suction inlet 23 for receiving a chemical cleaning agent for injection mixing with the water flowing through the injector 21. A suction line 24 is attached to the inlet 23 via a metering valve 26 and provides a path for the cleaning agent 27 from its reservoir 28. The water inlet 22 is connected to the water source through a pressure gauge 29 and a ball valve 31. The injector 21 is typically rated at 40 psi at the injection inlet with a 5 psi outlet rating and a vacuum of 29.5 inches of mercury.

The reservoir 28 may be a 55 gallon drum containing the aqueous cleaning solution 27. The solution in a reservoir of this size would contain approximately 6.5 pounds of ammonium hydroxide, 1.0 pounds of sodium linear alkyl polyester sulfonate, 1.75 pounds of ammonium chloride, 4.0 pounds of sodium acrylate silicate ester, 0.002 pounds of an anti-foam agent, 1.0 pounds of phosphate and 446 pounds of water. These constituents may be varied by up to ±10% and concentrations with the relative ratios of the non-water constituents remaining the same may be increased by 30 percent without reducing the stability of the solution. Conversely, water may be added to dilute the concentration by seventy percent without destroying the cleaning properties.

Thus the solution in the reservoir will contain about 0.99 to 1.85 percent by weight ammonium hydroxide; about 0.15 to 0.28 percent by weight sodium linear alkyl polyester sulfate; about 0.27 to 0.5 percent by weight ammonium chloride; about 0.61 to 1.13 percent by weight sodium acrylate silicate ester; about 4 ppm anti-foam; about 0.15 to 0.28 percent by weight phosphate ester with the balance water.

This solution will react with and remove acrylamide based polymers; oil and grease; mud, dirt and silt; iron deposits; and calcium deposits. The polymers in the polymeric residue attract and hold the remaining elements listed above in suspension. The oxidizers in the cleaning solution release the polymer bond and the wetting agents then react for oil and grease reduction. As this is achieved the non-ionic polymer in the cleaning solution (sodium acrylate silicate ester) reacts as a dispersant with the iron, calcium and other salts to complete the cleaning process.

Thus, in operation, my method and apparatus requires the belt press to be set in motion without any sludge therein. The ball valve 31 is opened to supply water to the injector 21 and thus to the spray bar 12. Cleaning solution 27 is drawn from the reservoir 28 into the injector 21 and mixed with the water with the diluted mixture being spread onto the filter media. Control of dilution is determined by holding the pH of the mixture to 8.5 to 9.5 which guarantees the cleaning process. The amount of cleaning solution in the mixture is controlled by the valve 26.

As will be understood, the cleaning process is chemically active as the belt 11 traverses the apparatus. The cleaning solution and released deposits are then rinsed from the filter media by the existing high pressure rinse sprayer 14.

Figure 2:
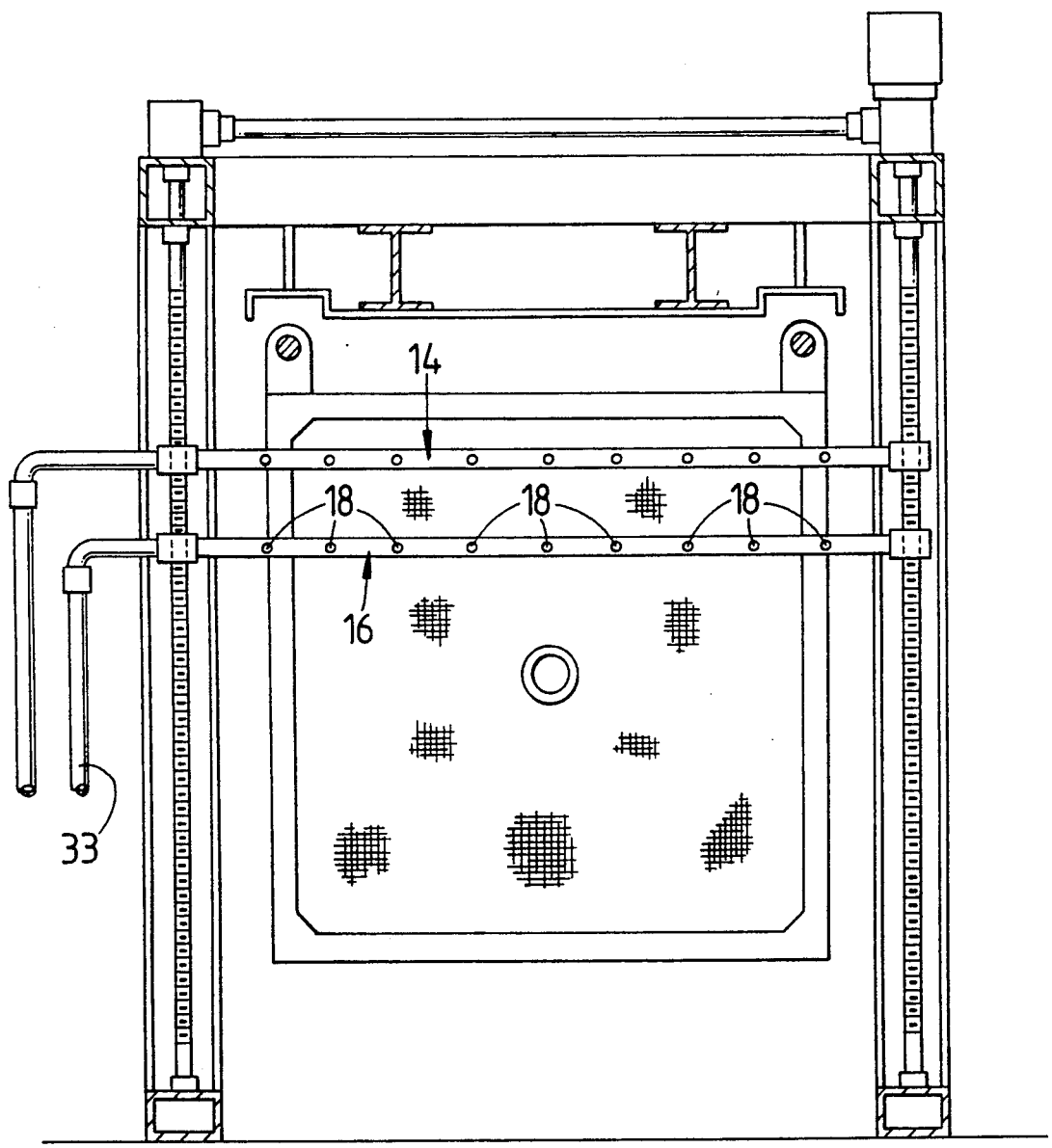
FIG. 2 is a diagrammatic depiction of the invention as installed in a plate type press.

The alternative embodiment shown in FIG. 2 differs only in that the spray bar is mounted to a movable support as is the high pressure rinse sprayer, such that these components are movable relative to the filter media. Such mounting arrangements are commonly used with plate type filter presses as is shown in U.S. Pat. Nos. 4,448,221; 3,633,651; 4,076,033; 4,107,042 and others. In this embodiment the tubing intermediate the spray bar 16 and the injector 21 is replaced by a suitable flexible conduit 33.

While I have shown my invention in two forms, it will be obvious to those skilled in the art that it is not so limited but is susceptible of various changes and modifications without departing from the spirit thereof.

What I claim is:

1. Apparatus for cleaning polymer and organic deposits from filter media of a dewatering apparatus to prevent blinding thereof by polymer and organic deposits thereon comprising:

(a) applicator means of automatically applying a substantially uniform mixture of water and a cleaning agent, which is chemically reactive with said polymer deposit, to the surface of a filter medial operatively mounted to a dewatering apparatus, during relative movement between said applicator means and said media wherein said media is moved by said dewatering apparatus:

(b) a source of water operatively connected to said applicator means;

(c) a source of cleaning agent; and (d) means for injecting cleaning agent received from said source thereof into water received from the source thereof intermediate said source and said applicator means to form said mixture.

2. Apparatus as described in claim 1 wherein said applicator means comprises an elongated tubular member having a plurality of nozzles spaced longitudinally therealong for directing a spray of said mixture onto said filter media.

3. Apparatus as described in claim 2 wherein said tubular member extends transversely across said filter media perpendicularly to the direction of relative movement with said nozzles spaced thereon to apply said spray evenly across said filter media.

4. Apparatus as defined in claim 2 further comprising means for adjusting the amount of cleaning agent in said mixture.

5. Apparatus as defined in claim 1 further comprising means for adjusting the amount of cleaning agent in said mixture.

6. Apparatus as defined in claim 1 wherein said cleaning agent comprises an ammonia based oxidizer in combination with surfactants, dispersants, anti-foam and wetting agents.

7. Apparatus as defined in claim 1 wherein said cleaning agent comprises an aqueous solution containing from about 0.99 to about 1.85 percent by weight ammonia hydroxide and about 0.61 to 1.13 percent by weight sodium acrylate silicate ester.

8. Apparatus for cleaning polymer and organic deposits from filter media of a dewatering apparatus to prevent blinding thereof by polymer and organic deposits thereon comprising:

(a) applicator means for automatically applying a substantially uniform mixture of water and a cleaning agent, which comprises about 0.99 to about 1.85 percent by weight ammonia hydroxide, about 0.61 to 1.13 percent by weight sodium acrylate silicate ester, about 0.27 to about 0.5 percent by weight ammonium chloride, about 0.15 to about 0.28 percent by weight sodium linear alkyl polyester sulfonate, about 0.15 to about 0.28 percent by weight phosphate ester and a trace anti-foam agent with the balance water, to the surface of a filter media during relative movement between said application means and said media;

(b) a source of water operatively connected to said applicator means;

(c) a source of cleaning agent; and (d) means for injecting cleaning agent received from said source thereof into water received from the source thereof intermediate said source and said applicator means to form said mixture.

9. Apparatus as defined in claim 7 wherein said applicator means comprises a plurality of nozzles in fluid communication with said means for injecting to receive and disperse said mixture evenly over the width of a filter media moving relative to said nozzles.

* * * * *